(12) United States Patent
Siimer

(10) Patent No.: US 12,540,749 B2
(45) Date of Patent: Feb. 3, 2026

(54) VENTILATOR UNIT AND METHOD FOR AUTONOMOUS VENTILATION USING THE VENTILATOR UNIT

(71) Applicant: Innoair OÜ, Viljandi (EE)

(72) Inventor: Juhan Siimer, Viljandi (EE)

(73) Assignee: INNOAIR OÜ, Viljandi (EE)

( * ) Notice: Subject to any disclaimer, the term of this patent is extended or adjusted under 35 U.S.C. 154(b) by 349 days.

(21) Appl. No.: 18/339,604

(22) Filed: Jun. 22, 2023

(65) Prior Publication Data
US 2023/0417445 A1 Dec. 28, 2023

(30) Foreign Application Priority Data
Jun. 23, 2022 (EP) .................................. 22180747

(51) Int. Cl.
*F24F 11/74* (2018.01)
*F24F 11/46* (2018.01)
*F24F 110/50* (2018.01)
*F24F 120/10* (2018.01)

(52) U.S. Cl.
CPC .............. *F24F 11/74* (2018.01); *F24F 11/46* (2018.01); *F24F 2110/50* (2018.01); *F24F 2120/10* (2018.01)

(58) Field of Classification Search
CPC ............. F24F 7/06; F24F 13/062; F24F 13/12
See application file for complete search history.

(56) References Cited

U.S. PATENT DOCUMENTS

| | | | |
|---|---|---|---|
| 5,333,835 A * | 8/1994 | Smith | F24F 13/16 137/554 |
| 6,527,194 B1 * | 3/2003 | Burke | F16K 47/04 137/625.38 |
| 10,514,177 B2 | 12/2019 | Hussain et al. | |
| 2018/0163987 A1 | 6/2018 | Rackes et al. | |
| 2019/0242599 A1 | 8/2019 | Sakai et al. | |
| 2021/0293439 A1 | 9/2021 | Melink et al. | |
| 2021/0302037 A1 | 9/2021 | Senia et al. | |
| 2021/0389004 A1 | 12/2021 | Ashino | |
| 2022/0221178 A1 | 7/2022 | Brahme et al. | |
| 2022/0299954 A1 | 9/2022 | Wellig et al. | |

FOREIGN PATENT DOCUMENTS

| | | |
|---|---|---|
| JP | 2016044944 A | 4/2016 |
| WO | 2023007624 A1 | 2/2023 |

* cited by examiner

*Primary Examiner* — Allen R. B. Schult
(74) *Attorney, Agent, or Firm* — Koivula & Somersalo, LLC

(57) ABSTRACT

The invention relates to a ventilator unit comprising a housing defining an air passage with a first port and a second port, a valve arranged in the air passage to control the air flow rate through the air passage, an actuator configured to operate the valve, and a controller configured to drive the actuator. The housing at the first port is configured to connect the first port to a duct outlet, and wherein the controller is configured to autonomously determine a drive signal to be sent to the actuator based on air measurement data.

11 Claims, 7 Drawing Sheets

VENTILATOR UNIT AND METHOD FOR AUTONOMOUS VENTILATION USING THE VENTILATOR UNIT

PRIORITY

This application claims priority to European application number EP22180747.2 filed on Jun. 23, 2022.

BACKGROUND OF THE INVENTION

The invention relates to a ventilator unit and method for ventilation using such a ventilator unit.

Ventilation is the process of exchanging or replacing air in a space to improve the air quality. The air quality can be improved by introducing high quality air into the space and/or removing low quality air from the space.

There are many approaches to ventilation depending on the number of spaces, the size of the spaces, and the use of the spaces. So far, it has been difficult to design a simple and energy efficient ventilation system. This becomes even more difficult when a ventilation system needs to be retrofitted into an existing building.

U.S. Pat. No. 10,514,177 discloses a ventilation system using a central processing device that is controlling all components of the system based on user requirements and measurement data wirelessly received from ventilator units. Some of these ventilator units include a plurality of blades that can be moved to open and close the ventilator unit based on a command received from the central processing device. This results in a complex system requiring a distributed mesh wireless communication network which sets limits to the positioning and distance between components and makes the system vulnerable to communication issues.

US2019/0242599 discloses a ventilator unit including a fan that is operable based on sensor data. The ventilator unit is connected to a duct in a ceiling of the space. To do this and to have sufficient space for the fan and other components while keeping the ventilator unit from extending from the ceiling too much, the inlet of the ventilator unit extends sideways to allow the ventilator unit to be arranged next to the duct in the ceiling. This requires a relatively large device and complex installation.

US2022/0299954 and JP2016/044944 disclose a ventilation system in which the occupancy of a space is determined, and the ventilation mode is set based on the space being occupied or not. In US2022/0299954, the system is able to determine the number of persons in a space and to adapt the ventilation mode thereto, but this again makes the system complex and for both prior art systems sufficient care needs to be taken for the sensors being able to "see" the entire space.

WO2023/007624 discloses a ventilator unit that draws air from the space, cools it and returns the air to the space. The unit is able to determine the occupancy of the space and to determine crowded areas within the space. The unit is then able to direct the outgoing airflow in the direction of the one or more crowded areas. For the cooling function, a connection is made with an outdoor unit and refrigerant is exchanged between the ventilator unit and the outdoor unit.

A drawback of determining occupancy of a space is that the ventilation mode is only changed after a person enters the space and it will take time until the new ventilation mode has reached an equilibrium. US2022/0221178 discloses a system in which machine learning is used to predict when a person will enter the space to allow the system to change the ventilation mode at an earlier stage making it more comfortable for the person entering the space.

US2021/0389004 discloses a ventilation system to ventilate multiple spaces simultaneously, wherein a single carbon dioxide sensor and an occupancy sensor per space are used to estimate the CO2 level in each space to provide sufficient ventilation for each space.

US2021/0293439 discloses a ventilation system for a building in which sensors measuring air quality parameters provide input to a central processing unit to allow the central processing unit to ventilate the building on demand.

US2021/0302037 discloses a ventilation system with individually controllable ventilation outlets that are controlled by a central processing unit allowing to adjust an air outflow direction and airflow rate of each ventilation outlet to provide different conditions to different people at different locations in the space.

US2018/0163987 discloses a complex ventilation system in which control is based on building pollution transport models, scientific estimates of ventilation impact on productivity, sick leave, and health, user preferences parameters, and/or weather, pollution, and price forecasts.

SUMMARY OF THE INVENTION

In view of the above it is an object of the invention to provide a ventilation system that is easy to install and use and at the same time is able to provide high indoor air quality and to reduce energy consumption.

According to a first aspect of the invention, there is provided a ventilator unit comprising:
  a housing defining an air passage with a first port and a second port,
  an infinitely openable and closable valve arranged in the air passage to regulate the flow rate through the air passage,
  an actuator configured to operate the valve, and
  a controller configured to drive the actuator,
wherein the housing at the first port is configured to connect the first port to a duct outlet or inlet,
and wherein the controller is configured to autonomously determine a drive signal to be sent to the actuator based on air measurement data in order to regulate the flow rate through the air passage.

A benefit of the ventilator unit according to the first aspect of the invention is that the ventilator unit can be used with both a passive or active ventilation system, and can be used for air inflow situations and air outflow situations thereby providing a versatile element that can be used in new buildings or easily retrofitted into existing building.

A further benefit of the ventilator unit is that it operates autonomously, meaning that no (remote) central processing device is needed to control the ventilator unit and that in case communication is possible with other devices and/or units, the ventilator unit keeps operating even when communication is (temporarily) lost. Hence, in an embodiment, the ventilator unit is configured to operate without any connection to other similar ventilator units or control devices.

In an embodiment, the first port extends in a first plane and the second port extends in a second plane, and wherein the first and second plane are substantially parallel to each other.

In an embodiment, the housing has a first dimension extending in a direction from the first to the second port of the housing, a second dimension extending in a direction perpendicular to the first dimension, and a third dimension extending in a direction perpendicular to the first and second dimension, and wherein the first dimension is smaller than the second dimension and the third dimension.

In an embodiment, the valve includes a valve member and a valve seat, wherein the valve member is moveable between a closed position, in which the valve member engages the valve seat, and a fully open position, in which the valve member is at a maximum distance from the valve seat.

In an embodiment, the valve member is cone shaped.

In an embodiment, the valve member extends in a plane parallel to the first and second plane.

In an embodiment, the valve member is moveable in a direction perpendicular to the first and second plane.

In an embodiment, the valve is the only mechanically operable component.

According to a second aspect of the invention, there is provided a ventilation system comprising at least one ventilator unit according to the first aspect of the invention and at least one measurement system to obtain the air measurement data.

According to a third aspect of the invention, there is provided a method for autonomous ventilation using a ventilator unit according to the first aspect of the invention, wherein the method comprises the following steps:
 a. receiving air measurement data by the controller,
 b. autonomously determining a drive signal based on the received air quality measurement data, and
 c. providing the determined drive signal to the actuator to set the valve.

In an embodiment, the air measurement data includes air quality measurement data.

In an embodiment, the valve is closed when air measurement data are in predetermined ranges and/or when no people are present.

According to a fourth aspect of the invention, there is provided a computer program comprising instructions which when the computer program is executed by a controller of a ventilator unit according to the first aspect of the invention, causes the ventilator unit to perform the method according to the third aspect of the invention.

BRIEF DESCRIPTION OF THE DRAWINGS

The invention will now be described in a non-limiting way by reference to the accompanying drawings in which like parts are indicated by like reference symbols preceded by the number of the relevant figure, and in which.

DETAILED DESCRIPTION OF THE INVENTION

Figure 1:
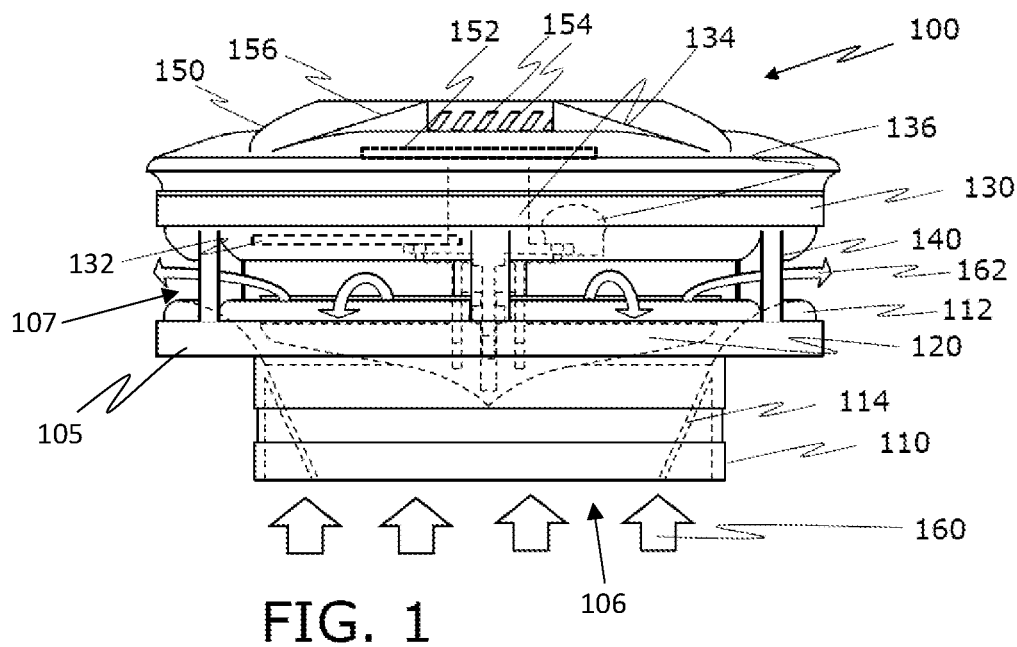
FIG. 1 schematically depicts a side view of a ventilator unit according to an embodiment of the invention.

FIG. 1 schematically depicts a side view of a ventilator unit 100 according to an embodiment of the invention. The ventilator unit 100 comprises a housing 105 defining an air passage with a first port 106 and a second port 107. Arranged in the air passage is an infinitely openable and closable valve to regulate the flow rate through the air passage. The valve includes a valve member 120 cooperating with a valve seat formed by inner wall 114 of the housing 105.

Further, an actuator 134 configured to operate the valve member 120 (and thus the valve), and a controller 132 configured to drive the actuator 134 are arranged in the housing 105.

The first port 106 is formed by a tube portion 110 allowing to connect the first port 106 to a duct outlet or inlet in for instance a building. Such duct outlets or inlets may be present in the ceiling or a wall of a building. The tube portion 110 may for instance be received by a duct outlet or inlet to connect the ventilator unit 100 to the duct outlet or inlet, e.g. in a clamping manner or using an adhesive or any other attachment means.

The ventilator unit 100 is based on the concept that the duct outlet or inlet allows ventilation by exchanging air via the duct outlet or inlet and thus via the ventilator unit. The ventilator unit 100 is configured to regulate the flow rate through the air passage based on air measurement data. To this end, the ventilator unit 100 of FIG. 1 also comprises a measurement system with one or more sensors 152 configured to obtain the air measurement data.

The one or more sensors 152 are arranged inside the housing 105 and air is allowed to reach the one or more sensors for measurement purposes via openings 154. Air directing means 156 are provided on the housing 105 to guide air towards the opening 154. The air measurement data obtained by the measurement system is provided to the controller 132, which controller 132 is configured to autonomously determine a drive signal to be sent to the actuator 134 in order to regulate the flow rate through the air passage.

The housing 105 may comprise a plurality of modules that are releasably connectable to each other which has the benefit that the modules can be assembled first and subsequently combined to form the ventilator unit 100. A first module is mainly formed by the tube 110. The tube 110 supports the concentric cone shaped inner wall 114 that is configured to direct air flow and form the valve seat for valve member 120. The inner wall 114 is connected to a curved flange 112 of the first module.

A second module of the housing 105 is formed by control module 130 including controller 132, actuator 134 and valve member 120. The control module 130 also includes a power device 136 allowing to provide power to the ventilator unit 100. The valve member 120 can be moved in and out of the first module between a closed position to engage with the inner wall 114 and an open position with the valve member 120 being at a distance from the inner wall 114. The control module 130 is connected to the first module using a plurality of spacers 140. This forms openings between the plurality of spacers 140, the curved flange 112 of the first module and the second module to form the second port 107 of the air passage through the housing 105.

A third module of the housing 105 is formed by sensor module 150 including the one or more sensors 152, the openings 154 and air directing means 156. The sensor module 150 is mechanically connected to the control module 130. The connection between the sensor module 150 and the control module 130 may also provide a data connection between the one or more sensors 152 and the controller 132 and/or a power connection between the power device 136 and the one or more sensors, possibly via the controller 132.

When the valve member 120 is in an open position, the air passage is not blocked completely by the valve member 120 allowing an air flow, for instance as shown using the arrows 160 and 162, wherein the arrows 160 represent an air flow at the first port 106 originating from the duct outlet the ventilator unit 100 is connected to, and wherein the arrows 162 represent an air flow at the second port 107 between the curved flange 112 and the control module 130 to enter a space the ventilator unit is installed. The direction of the arrows 160 and 162 in FIG. 1 is now such that it corresponds to air being provided from a duct outlet via the ventilator unit 100 to a space, but it is of course also possible that the air flow is in an opposite direction, namely, from the space via the ventilator unit 100 to a duct inlet. It is also envisaged that the ventilator unit 100 is used to allow air flow in both directions depending on a pressure difference applied between the space and the duct outlet/inlet, which pressure difference may for instance be actively applied by another part of a ventilation system, e.g. a fan, pump, compressor, or passively using a chimney or the like.

Figure 2:
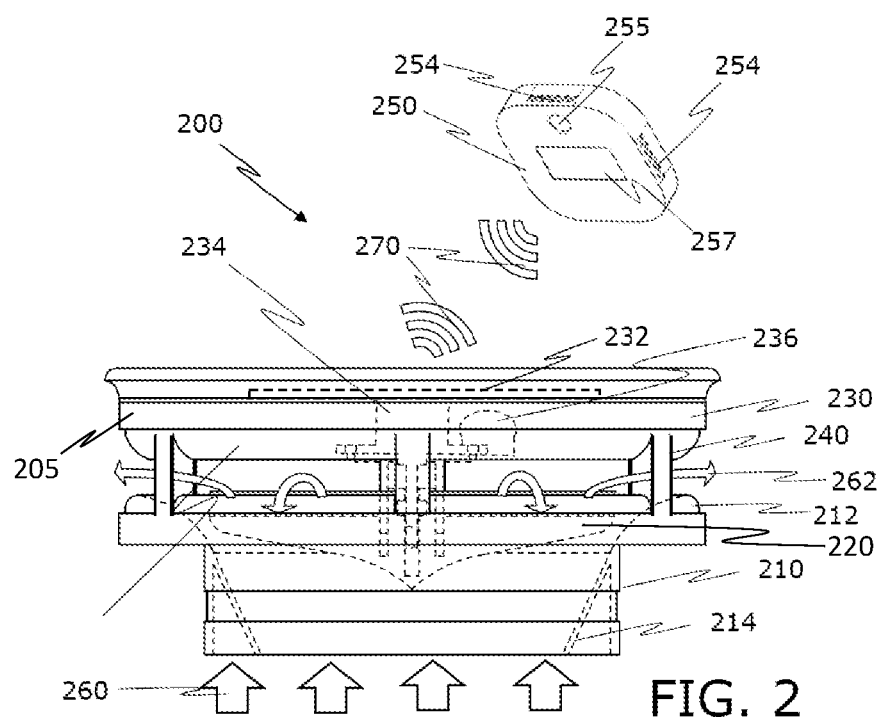
FIG. 2 schematically depicts a side view of a ventilator unit according to another embodiment of the invention.

FIG. 2 schematically depicts a side view of a ventilator unit 200 according to another embodiment of the invention. The ventilator unit 200 is very similar to the ventilator unit 100 of FIG. 1 as it also includes housing 205 with a first module with a tube 210, inner wall 214 and curved flange 212, and includes a control module 230 as second module with a controller 232, actuator 234, power device 236, and valve member 220, which control module 230 is connected to the first module using spacers 240. For a description of the function and construction of the first module and the control module 230 reference is made to the description of the ventilator unit 100 of FIG. 1 and the corresponding components. The possible air flow through the ventilator unit is indicated using arrows 260 and 262. Below, emphasis will be given to the differences between the embodiments of FIG. 1 and FIG. 2.

The main difference is that the measurement system is not part of the ventilator unit 200 and thus the ventilator unit 200 does not include a sensor module as in FIG. 1. Instead, the ventilator unit 200 is configured to communicate over a wireless communication network 270 with a separate measurement system 250. In this embodiment, the measurement system 250 includes a movement sensor 255, two or more openings 254, and a display 257. The two or more openings 254 allow air to enter the measurement system 250 to reach additional sensors to obtain air measurement data.

Figure 3:
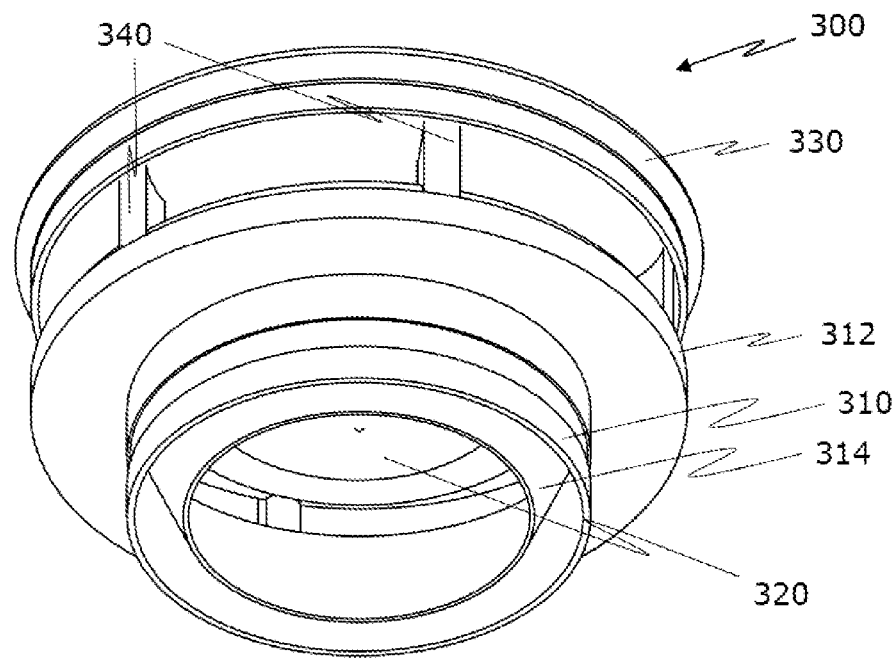
FIG. 3 schematically depicts a perspective view of a ventilator unit according to an embodiment of the invention which view corresponds to the construction and design of the ventilator units of FIGS. 1 and 2.

FIG. 3 schematically depicts a perspective view of a ventilator unit 300 which view corresponds to the construction and design of the ventilator units of FIGS. 1 and 2. In FIG. 3, the valve member 320 is in an open position illustrating the open space between the flange 312, the control module 330 and the spacers 340. FIG. 3 also clearly illustrates the inner wall 314 of tube 310.

Figure 4:
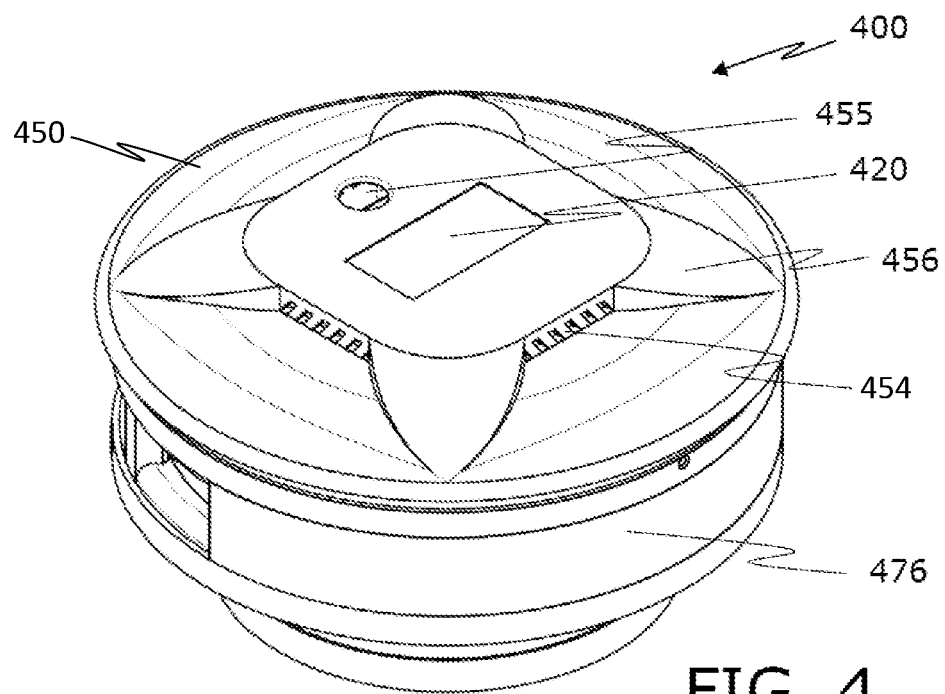
FIG. 4 schematically depicts a perspective view of the ventilator unit of FIG. 1.

FIG. 4 schematically depicts a perspective view of the ventilator unit of FIG. 1, which ventilator unit in this figure will be referred to as ventilator unit 400. The perspective view of FIG. 4 gives a more detailed view of the sensor module 450. The sensor module 450 further includes a movement sensor 455 and a display 420. Also clearly visible are the openings 454 and air directing means 456 to guide air towards the one or more sensors 152 described in relation to FIG. 1. Also visible in this FIG. 4 is that the ventilator unit 400 may be provided with an element 476 to close a portion of the second port. Without element 476, the second port has the benefit of distributing air evenly around the ventilator unit. However, in some situations, there may be no need to direct an air flow in a certain direction, for instance in the direction of nearby wall when the ventilator unit 400 is installed in a ceiling close to a wall of a space. Thus, to distribute the air more efficiently in the space, the element 476 can be used to direct the air flow in an opposite direction. In an embodiment, the element 476 is optional and can be arranged at different locations in the second port or can be moved allowing to adjust the distribution of air even after installation of the ventilator unit.

Figure 5A:
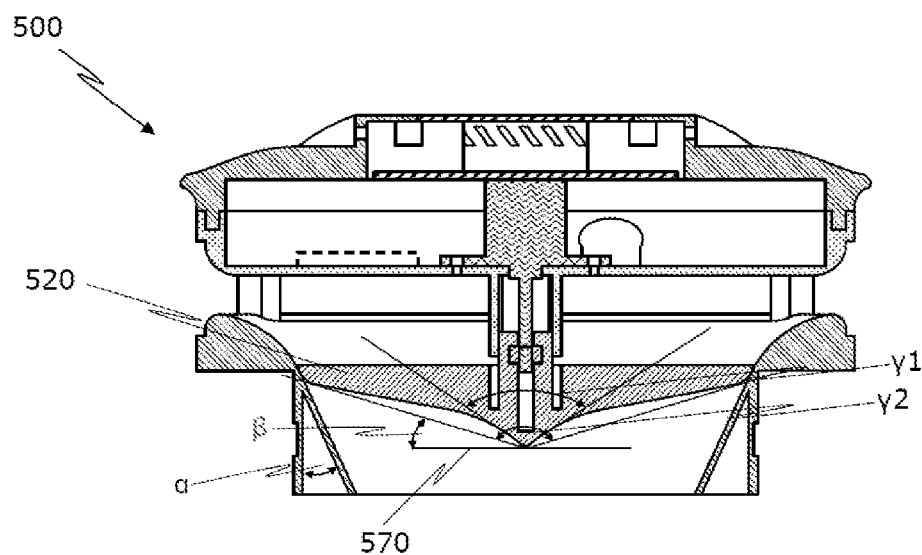
FIG. 5A schematically depicts a cross-sectional view of the ventilator unit of FIG. 1 with the valve member in the closed position.
Figure 5B:
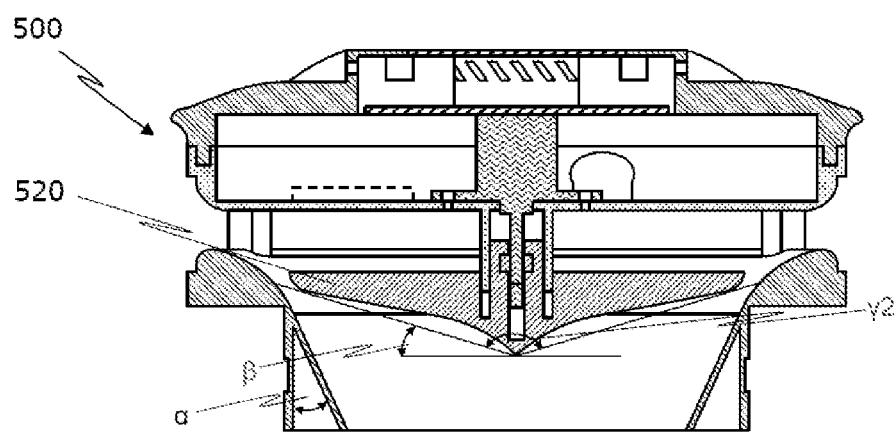
FIG. 5B schematically depicts a cross-sectional view of the ventilator unit of FIG. 1 with the valve member in an intermediate open position.
Figure 5C:
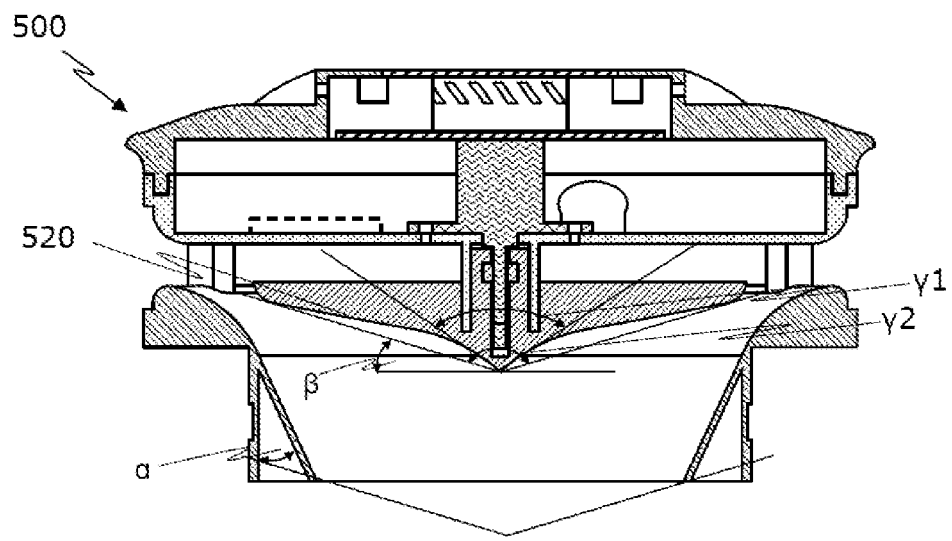
FIG. 5C schematically depicts a cross-sectional view of the ventilator unit of FIG. 1 with the valve member in the fully open position.

FIGS. 5A-5C schematically depict cross-sectional views of the ventilator unit of FIG. 1, here indicated using reference numeral 500, with the valve member 520 in different positions.

In FIG. 5A, the valve member 520 has been brought in engagement with the valve seat (see inner wall 114 in FIG. 1) so that the air passage is closed, or in other words 0% opened.

In FIG. 5C, the valve member 520 has been fully retracted by the actuator (see actuator 134 in FIG. 1) providing maximum distance between valve member 520 and valve seat so that the air passage is fully open, or in other words 100% opened.

In this embodiment, the actuator is a rotational actuator with a threaded shaft received in a threaded bore of the valve member 520 allowing a multitude of intermediate open positions in between the fully closed position of FIG. 5A and the fully open position of FIG. 5C. A multitude of intermediate positions, at least five, preferably at least ten, more preferably at least twenty, even more preferably at least fifty, and most preferably at least one hundred, is referred to as infinitely openable and closeable.

FIG. 5B depicts the valve member 520 in one of the intermediate positions. The shown intermediate position may be referred to as the 50% opened position as the valve member 520 is at the same distance from both the fully open position and the fully closed position. However, other definitions for the percentage, e.g. based on cross-sectional area or flow rate may also be used.

Figure 6A:
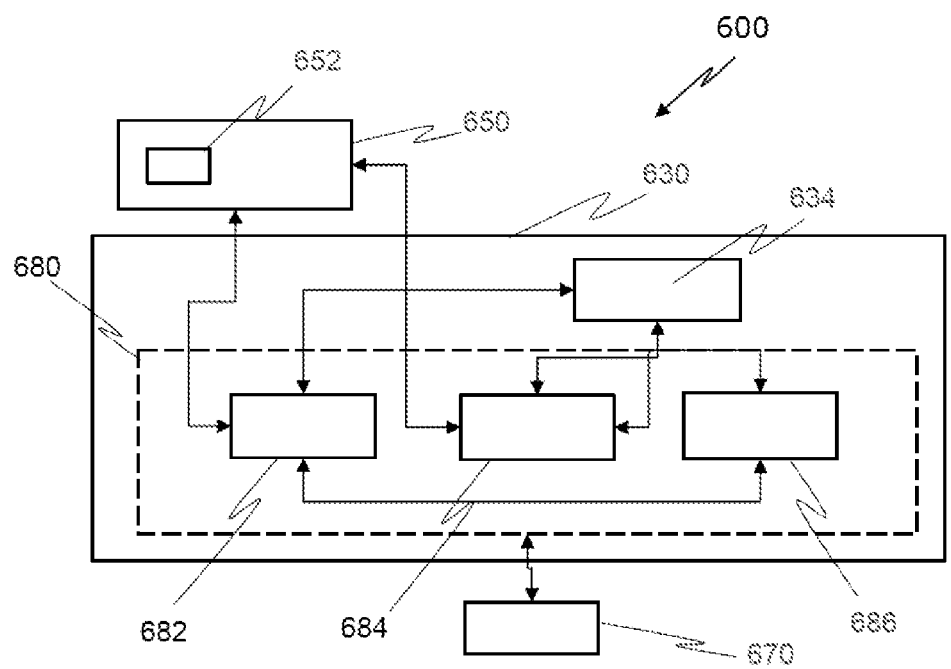
FIG. 6A schematically depicts a block scheme of a ventilation system according to an embodiment of the invention including a ventilator unit similar to the ventilator unit of FIG. 1.

FIG. 6A schematically depicts a block scheme of a ventilation system 600 according to an embodiment of the invention including a ventilator unit similar to the ventilator unit of FIG. 1.

The ventilation system 600 comprises a ventilator unit including a control module 630 and a sensor module 650. The sensor module 650 comprises a sensor 652, and the control module 630 comprises a control unit 680 and an actuator 634. The control unit 680 comprises a power device 682, a controller 684 and a communication device 686. The power device 682 is also configured to provide power to the sensor module 650, the actuator 634, and the communication device 686. The controller 684 is configured to communicate with the sensor module 650, to control the actuator 634, and to control the communication device 686.

The ventilation system 600 further comprises a user device 670 configured to communicate with the control module 630.

Figure 6B:
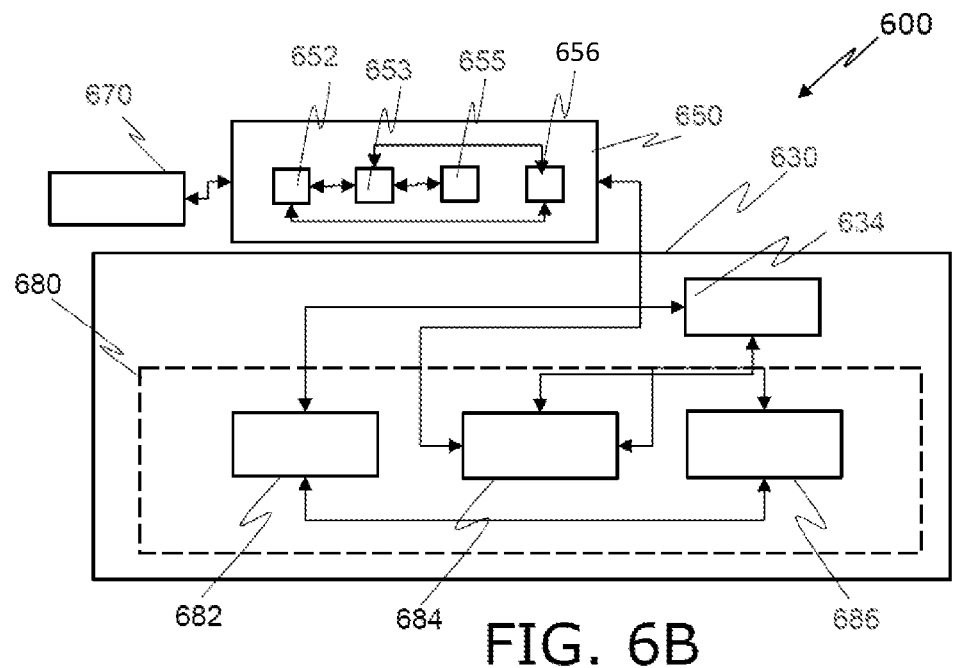
FIG. 6B schematically depicts a block scheme of a ventilation system according to another embodiment of the invention including a ventilator unit similar to the ventilator unit of FIG. 2.

FIG. 6B schematically depicts a block scheme of a ventilation system 600 according to another embodiment of the invention including a ventilator unit similar to the ventilator unit of FIG. 2.

The ventilation system 600 comprises a ventilator unit including a control module 630. The control module 630 comprises a control unit 680 and an actuator 634. The control unit 680 comprises a power device 682, a controller 684, and a communication device 686.

The ventilation system 600 further comprises a sensor module 650 and a user device 670 configured to communicate with the sensor module 650. The sensor module 650 comprises a sensor 652, a microprocessor 653, a display 655, and a sensor power device 656. The sensor power device 656 is configured to provide power to the sensor 652 and the microprocessor 653. The microprocessor 653 is configured to receive air measurement data from the sensor 652 and to control the display 655.

The power device 682 is configured to provide power to the actuator 634 and to the communication device 686. The controller 684 is configured to communicate with the sensor module 650, to control the actuator 634, and to control the communication device 686.

Figure 6C:
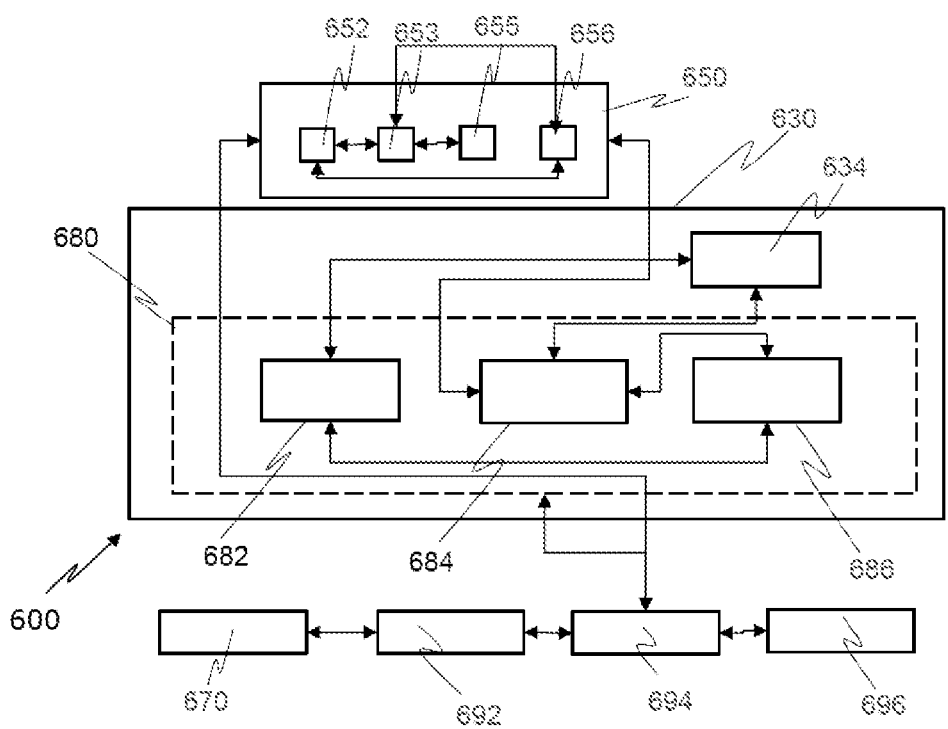
FIG. 6C schematically depicts a block scheme of a ventilation system according to a further embodiment of the invention.

FIG. 6C schematically depicts a block scheme of a ventilation system 600 according to a further embodiment of the invention. The ventilation system includes a ventilator unit in accordance with an embodiment of the invention, e.g. a ventilator unit similar to the ventilator unit of FIG. 2, and including a control module 630. The control module 630 comprises a control unit 680 and an actuator 634. The control unit 680 comprises a power device 682, a controller 684, and a communication device 686.

The ventilation system 600 further comprises a sensor module 650, a user device 670, a server 692, and a gateway 694.

The sensor module 650 comprises a sensor 652, a microprocessor 653, a display 655, and a sensor power device 656. The sensor power device 656 is configured to provide power to the sensor 652 and the microprocessor 653. The microprocessor 653 is configured to receive air measurement data from the sensor 652 and to control the display 655.

The user device 670 is configured to communicate with the server 692. The gateway 694 is configured to communicate with the control unit 680 of the ventilator unit, with the sensor module 650, with another ventilator device or system 696, and with the server 692.

Figure 7A:
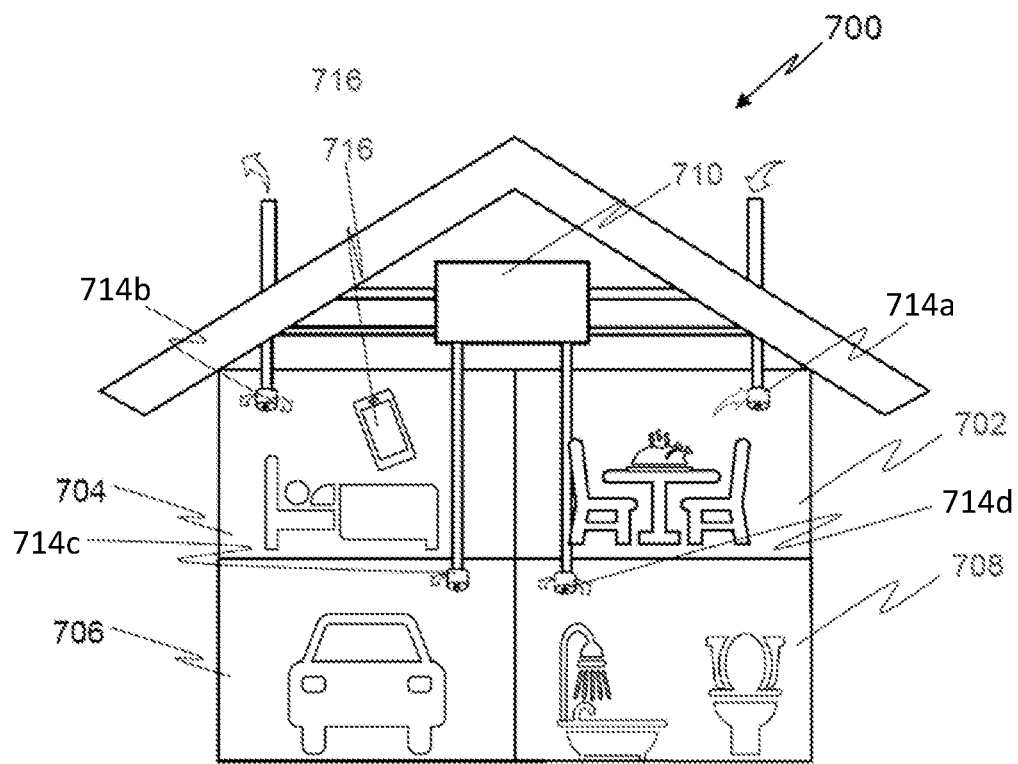
FIG. 7A schematically depicts a cross-sectional view of a building equipped with a ventilation system according to an embodiment of the invention including multiple ventilator units similar to the ventilator unit of FIG. 1.
Figure 7B:
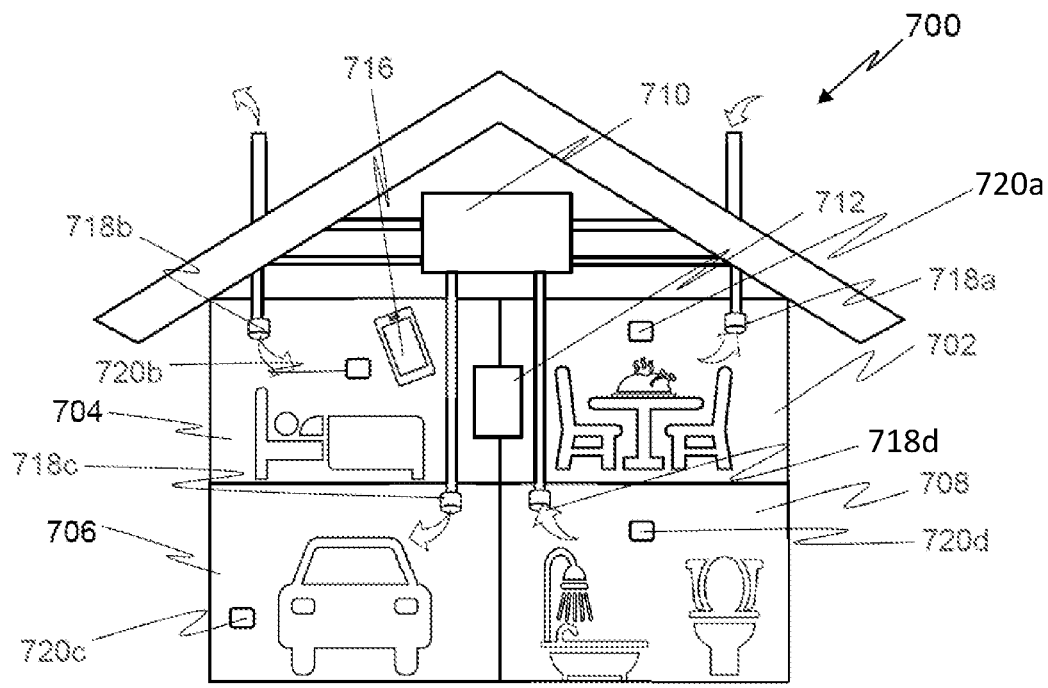
FIG. 7B schematically depicts a cross-sectional view of a building equipped with a ventilation system according to an embodiment of the invention including multiple ventilator units similar to the ventilator unit of FIG. 2.

FIGS. 7A and 7B schematically depict a cross-sectional view of a building 700 equipped with a ventilation system according to the invention. The building 700 in the examples of FIGS. 7A and 7B comprises four rooms, namely, a kitchen 702, a bedroom 704, a garage 706, and a bathroom 708. The building 700 may be equipped with a HVAC unit 710 to which ventilation ducts are connected that end in each room.

Mounted to each ventilation duct in FIG. 7A are ventilator units 714a, 714b, 714c, 714d, respectively, which ventilator units are similar to the ventilator unit of FIG. 1. The ventilator units 714a, 714b, 714c and 714d may be configured to communicate with a user device 716.

Mounted to each ventilation duct in FIG. 7B are ventilator units 718a, 718b, 718c, 718d, respectively, which ventilator units are similar to the ventilator unit of FIG. 2. Corresponding sensor modules 720a, 720b, 720c, 720d, respectively, are placed onto the walls in each room. The ventilator units 718a, 718b, 718c, and 718d are configured to communicate with a user device 716, a corresponding sensor module 720a, 720b, 720c, 720d, and a gateway 712.

Figure 8A:
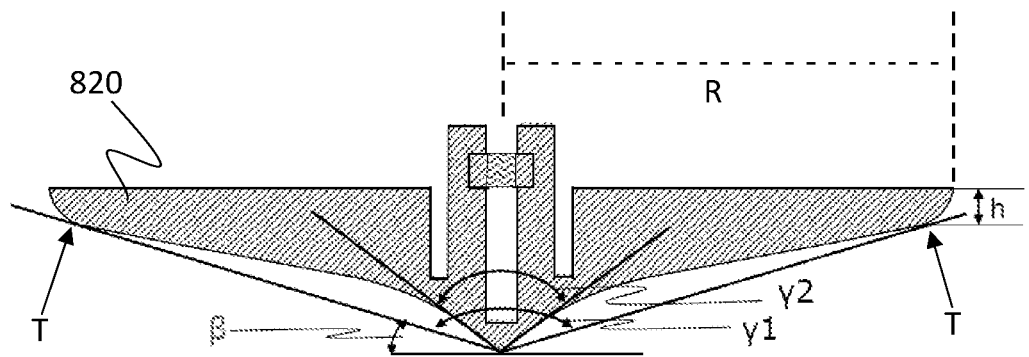
FIG. 8A schematically depicts a cross-sectional view of a valve member used in the ventilator units of FIGS. 1 and 2.
Figure 8B:
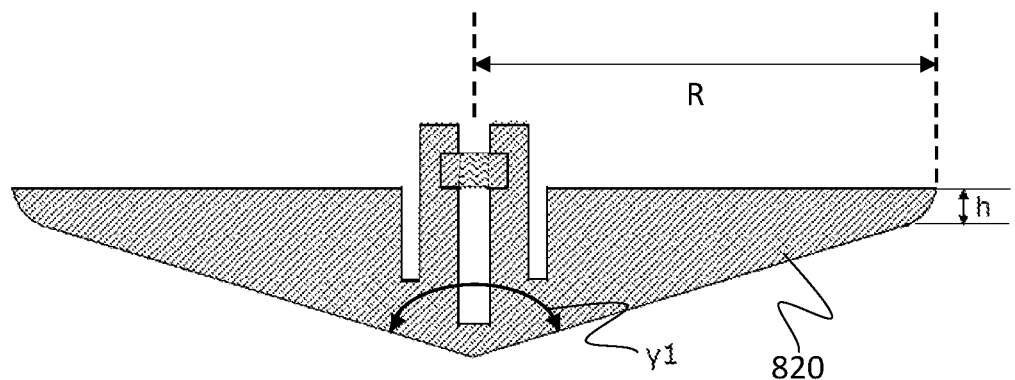
FIG. 8B schematically depicts a cross-sectional view of a valve member according to a further embodiment and suitable to be used in the ventilator units of FIGS. 1 and 2.
Figure 8C:
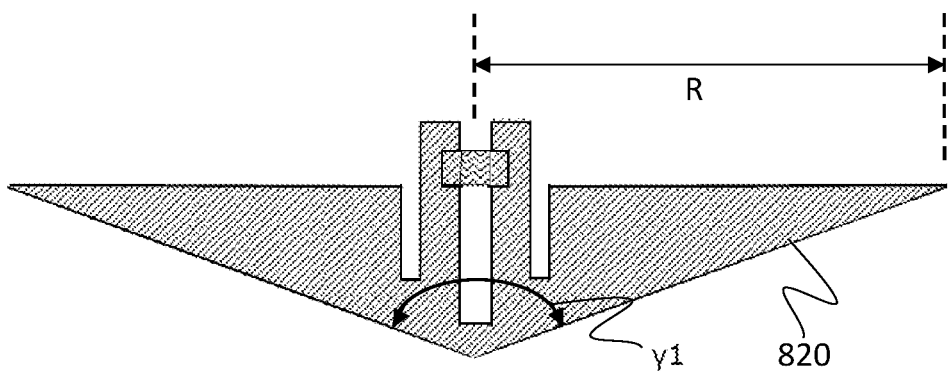
FIG. 8C schematically depicts a cross-sectional view of a valve member according to yet another embodiment and suitable to be used in the ventilator units of FIGS. 1 and 2.

FIGS. 8A-8C schematically depict cross-sectional views of valve members 820 that are suitable to be used in ventilator units of FIGS. 1 and 2.

FIG. 8C depicts a right circular cone shaped valve member 820 that can be defined by its aperture $\gamma 1$ and radius R. The aperture 71 is preferably in the range of 140-160 degrees, more preferably in the range of 144-152 degrees, for instance 146-148 degrees.

FIG. 8B depicts a cone shaped valve member 802 that has a first portion extending from the apex towards the base of the cone that has a right circular cone shape and a second portion that bends towards the base of the cone. The cone shaped valve member 802 of FIG. 8B can be characterized by the aperture $\gamma 1$, the radius R, and the thickness h of the second portion.

FIG. 8A depicts a cone shaped valve member 820 with a curved surface, which curved surface is concave. The valve member 820 fits in a virtual right circular cone shape extending from the apex of the valve member 820 to a location T where the virtual cone shape is tangent to the actual curved surface of the valve member 820. The portion between the apex and the location T will be referred to as the first portion. The portion between location T and the base of the cone shape is referred to as the second portion.

The second portion bends towards the base similar to the second portion of the cone shaped valve member of FIG. 8B.

The cone shaped valve member 820 of FIG. 8A can be characterized by the aperture 71 of the virtual right circular cone shape, the aperture 72 of the actual curved shaped cone, the thickness h of the second portion, and the radius R.

The aperture 71 may alternatively be defined using angle $\beta$ which is the angle of a right circular cone between the cone surface and the base. FIG. 8A includes the indication of such an angle $\beta$ for the virtual right circular cone shape. The relationship between aperture $\gamma 1$ and angle $\beta$ can be defined as: $\gamma 1 = 180 - 2\ast\beta$. Hence, when for instance $\gamma 1$ is in the range 146-148 degrees, B is in the range of 16-17 degrees.

The aperture $\gamma 2$ is preferably in the range of 90-120 degrees, more preferably in the range of 95-110 degrees, for instance 101-102 degrees. It has been found that when angle $\beta$ is 16.72 degrees ($\gamma 1$ is 146.56 degrees) and $\gamma 2$ is 101.33 degrees, this results in surprisingly good aerodynamic effect and noise reduction.

All shown ventilator units are mountable to a duct outlet or inlet, for instance a duct outlet or inlet to supply fresh air or to extract air as used in residential buildings, private houses, small cottages, commercial buildings and industrial buildings. The duct outlet or inlet may be an opening in a wall or ceiling or an opening of a ventilation pipe and may be flexible or rigid.

A ventilator unit according to the invention can be mounted to duct inlet to extract air, to a duct outlet to supply fresh air, or to a duct outlet and inlet that can be used to both extract air and to supply fresh air.

The duct outlet or inlet may have a circular or square cross-section.

Although the above-described embodiments suggest that the power devices used are batteries or the like, it is of course also envisaged that the ventilator unit is connected to a power supply using cables.

Although the ventilator units according to the invention are able to autonomously determine a drive signal to be sent to the actuator based on air measurement data, the ventilator units may be configured to communicate with one or more user devices, such as a smart device (e.g. smartphone, tablet or other portable handheld device), laptop or personal computer. The ventilator unit can be configured to communicate with one or more user devices by a ventilation computer program. This enables for instance the user to see measurement statistics on the display of the sensor module or on the display of the user devices, to define values of the parameters to be monitored and measured, switch the ventilator unit on and off, and/or to set a priority value of the space ventilated using the ventilator unit.

The air measurement data used by the ventilator unit to control the flow rate through the ventilator unit may require the indirect or direct measurement of one or more of the following air quality parameters:

$CO_2$
CO
$O_2$
Volatile Organic Compound (VOC)
Temperature
Humidity
Pressure

An example of an indirect measurement is the determination of the presence and/or movement of people in a room by a people movement sensor.

Hence, the one or more sensors (as e.g. provided in the above-described sensor modules) used for these direct or indirect measurements may be selected from the group comprising a VOC sensor, a temperature sensor, a $CO_2$ sensor, a CO sensor, a people movement sensor (e.g. a PIR sensor), a humidity sensor, an air pressure sensor, a light sensor, a gesture sensor and a coulomb counter.

In an exemplary embodiment of the autonomous determination by the ventilator unit, the controller may ventilate a room when air measurement data indicate that one or more parameters are not within a predetermined range and may close the valve when the parameters are within a predetermined range and/or no persons are present to reduce energy consumption.

The autonomous determination by the controller may include one or more of the following steps carried out by the controller:

Communicating with one or more sensor modules, possibly via a gateway,
Controlling of sensors, actuators, and connections,
Autonomously determining the desired position of the valve member based on the air measurement data,
Processing data measured by the sensors of the sensor module,
Enabling communication with a user device,
Communicating with sensors and display,
Exchanging data between sensor module and user device.

As mentioned above, a user device may be used to set a priority of the space ventilated using the ventilator unit. This priority value may be used by the controller to autonomously determine its next action. In an exemplary embodiment, at least two ventilator units are provided, each in a different room, and each ventilator unit being provided with its own priority value. The at least two ventilator units may communicate with each other to send requests to each other. Such a request may for instance relate to reducing ventilation in another room so that more resources, e.g. fresh air, are available for the requesting ventilator unit. However, such a request may also relate to increasing ventilation in another room so that for instance heat exchange may become more efficient based on the ventilation need. When sending the request, the priority value of the requesting ventilator unit may be sent along with the request allowing the receiving ventilator unit to compare the priority value in the request with its own priority value allowing the controller of the receiving ventilator unit to autonomously determine whether to meet the request (at least partially) or not at all. The receiving ventilator unit may return a signal to the requesting ventilator unit indicating its response allowing the requesting ventilator unit to autonomously determine what to do next.

In an embodiment, a ventilator unit has a presence mode and an absence mode, wherein the controller is configured to determine the presence of people in a room (e.g. using an integral sensor or by receiving a remote sensor signal) and is further configured to operate the ventilator unit in presence mode when people are present in the room and to operate the ventilator unit in absence mode when no people are present in the room. A difference between presence mode and absence mode may be that in presence mode more stringent demands with respect to relevant parameters apply than in absence mode. This ensures a minimum quality of the air in the room when no people are present in the room which may be better compared to the situation that the valve is closed when no people are present and ensures that when people enter an unoccupied room, the air quality is at a minimum desired level and not a lot of ventilation power is needed to correct this in the first couple of minutes after entering.

In an embodiment, the controller comprises pre-programmed modes that can be chosen based on user input and/or one or more modes that can be made using user input. A ventilation mode may for instance be chosen or made based on the type of room the ventilator unit is mounted. For instance, the ventilator unit may be mounted to a ventilation duct in a toilet (WC) or other room which requires fresh air at a higher rate than other rooms. It is further a characteristic that the room is occupied for a relatively short amount of time, but that ventilation is needed for some time after a person leaving the room. Hence, once it is detected that ventilation is needed, e.g. by detecting the presence of a person or by detecting a reduction in air quality, the controller of the ventilator unit may be configured to operate for a predetermined amount of time, for instance a predetermined amount of time after the room is left unoccupied.

Ventilation may be complex, especially when one tries to regulate multiple parameters with just a single ventilator unit. It may not be possible to regulate all parameters sufficiently. Different modes may be used by the ventilator unit allowing to prioritize different parameters. For instance, in the toilet, the CO2 level may have priority over the humidity level, while in the bathroom, the humidity level may have priority over the CO2 level. Priority of a certain parameter over another parameter does not affect the possibility that the controller may be configured to keep all parameters within a safe range.

Characteristics of a room may thus be provided to the controller, e.g. whether the room is more or less humid or more or less dry, whether there are unpleasant odors in the room, whether the room temperature is too high or too low, how often people visit or use the room, how much time people spent in that room, outdoor humidity and temperature, etc., allowing the controller to determine a change in air measurement data or the presence of one or more people in the room or both and to take appropriate action.

The modes available for the controller of the ventilator unit may further comprise specific seasonal modes if the outdoor conditions change substantially, e.g. a winter and summer mode.

It is noted that depending on the use of the ventilator unit, the positioning of the sensors, independent of the situation that sensors are part of the ventilator unit and/or provided as a separate module, may be relevant. When the ventilator unit is used to provide fresh air to a room, the sensors measuring air quality should preferably not measure the parameters of the fresh air entering the room but parameters from the air at a distance from the ventilator unit. When the ventilator unit is used to extract air from a room, the sensors can be positioned closer to the outlet without affecting the measurement result. The ventilator unit of FIG. 1 is therefore more suitable for a situation in which the ventilator unit is used to extract air from a room and the ventilator unit of FIG. 2 with the sensor module being positioned for instance at an opposite side of the room is more suitable for a situation in which the ventilator unit is used to supply fresh air.

The controller of a ventilator unit may comprise a processing unit and a storage.

Communication devices may comprise communication transceiver, WLAN controller, LAN controller with Power Over Ethernet (PoE), LoraWAN, Zigbee, BLE, Bluetooth, etc.

In the above-described embodiments, the tube for connecting the ventilator unit to a duct outlet or inlet has an inner wall for guiding the air flow and an outer wall for engaging with the duct. The angle α (see FIGS. 5A-5C) between the outer wall and the inner wall may be in the range of 20-30 degrees, preferably between 23-25 degrees, and more preferably 24.1-24.2 degrees, e.g. 24.15 degrees. Surprisingly good aerodynamic effect and noise reduction can be achieved for such angles.

The invention claimed is:

1. A ventilator unit configured to ventilate a space, the ventilator unit comprising:
   a housing defining an air passage with a first port and a second port, wherein the first port comprises a tube portion,
   an infinitely openable and closable valve arranged in the air passage to regulate the flow rate through the air passage,
   an actuator configured to operate the valve, and
   a controller configured to drive the actuator,
wherein the tube portion of the first port is configured to connect the first port to a ventilation duct outlet or inlet, and the second port is configured to remain outside the ventilation duct outlet or inlet,
and wherein the controller is configured to autonomously determine a drive signal to be sent to the actuator based on air measurement data in order to regulate the flow rate through the air passage, wherein flow of the air is through the first port to the second port or vice versa depending on a pressure difference between the space and the duct ventilation duct outlet or inlet.

2. The ventilator unit according to claim 1, wherein the first port extends in a first plane and the second port extends in a second plane, and wherein the first and second plane are substantially parallel to each other.

3. The ventilator unit according to claim 1, wherein the housing has a first dimension extending in a direction from the first to the second port of the housing, a second dimension extending in a direction perpendicular to the first dimension, and a third dimension extending in a direction perpendicular to the first and second dimension, and wherein the first dimension is smaller than the second dimension and the third dimension.

4. The ventilator unit according to claim 1, wherein the valve includes a valve member and a valve seat, wherein the valve member is moveable between a closed position, in which the valve member engages the valve seat, and a fully open position, in which the valve member is at a maximum distance from the valve seat.

5. The ventilator unit according to claim 4, wherein the valve member is cone shaped.

6. The ventilator unit according to claim 4, wherein the valve member extends in a plane parallel to a first and a second plane.

7. The ventilator unit according to claim 4, wherein the valve member is moveable in a direction perpendicular to a first and a second plane.

8. The ventilator unit according to claim 1, wherein the valve is the only mechanically operable component.

9. A ventilation system comprising at least one ventilator unit according to claim 1 and at least one measurement system to obtain the air measurement data.

10. A method for autonomous ventilation, wherein the method comprises the following steps:
   a) providing a ventilator unit according to claim 1,
   b) receiving air measurement data by the controller,
   c) autonomously determining a drive signal based on the received air measurement data, and
   d) providing the determined drive signal to the actuator to set the valve in order to regulate the flow rate through the air passage.

11. The method according to claim 10, wherein the valve is closed when air measurement data are in predetermined ranges and/or when no people are present.

* * * * *